(12) United States Patent
Coutinho et al.

(10) Patent No.: US 11,409,515 B2
(45) Date of Patent: Aug. 9, 2022

(54) UPGRADE DETERMINATIONS OF DEVICES BASED ON TELEMETRY DATA

(71) Applicant: Hewlett-Packard Development Company, L.P., Spring, TX (US)

(72) Inventors: Roberto Argenta Coutinho, Porto Alegre (BR); Maikel Maciel Ronnau, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/262,076

(22) PCT Filed: Feb. 1, 2019

(86) PCT No.: PCT/US2019/016381
§ 371 (c)(1),
(2) Date: Jan. 21, 2021

(87) PCT Pub. No.: WO2020/159547
PCT Pub. Date: Aug. 6, 2020

(65) Prior Publication Data
US 2021/0349707 A1 Nov. 11, 2021

(51) Int. Cl.
*G06F 8/65* (2018.01)
*H04L 67/00* (2022.01)

(52) U.S. Cl.
CPC .............. *G06F 8/65* (2013.01); *H04L 67/34* (2013.01)

(58) Field of Classification Search
CPC .............. H04L 67/34; G06F 8/65; G06F 8/61
See application file for complete search history.

(56) References Cited

U.S. PATENT DOCUMENTS

| | | | |
|---|---|---|---|
| 8,516,308 B1* | 8/2013 | Gill | G06F 11/079 717/176 |
| 8,595,282 B2* | 11/2013 | Nachenberg | G06F 21/552 709/200 |
| 8,606,545 B2 | 12/2013 | Cromer et al. | |
| 8,880,792 B2 | 11/2014 | Weksler et al. | |
| 9,015,441 B2 | 4/2015 | Worthington et al. | |
| 10,120,790 B1 | 11/2018 | Varteresian et al. | |
| 10,365,911 B2* | 7/2019 | Gilman | G06F 8/65 |
| 2004/0034853 A1* | 2/2004 | Gibbons | G06F 16/958 707/E17.116 |
| 2005/0108369 A1 | 5/2005 | Sather et al. | |
| 2010/0318986 A1* | 12/2010 | Burke | G06F 21/16 717/176 |
| 2012/0317266 A1* | 12/2012 | Abbott | G06Q 30/0278 709/224 |
| 2014/0059225 A1 | 2/2014 | Gasparakis et al. | |
| 2015/0088772 A1 | 3/2015 | Shwartz et al. | |

(Continued)

*Primary Examiner* — Marina Lee
(74) *Attorney, Agent, or Firm* — Perry + Currier Inc

(57) ABSTRACT

An example of an apparatus including a communication interface to receive telemetry data from a client device. The telemetry data includes a resource capacity and a usage level. The apparatus further includes a grading engine to generate a scoring map. The apparatus also includes a diagnostic engine in communication with the communication interface and the grading engine. The diagnostic engine is to generate a score based on an application of the scoring map on the telemetry data. The apparatus also includes an upgrade engine to implement an upgrade at the client device based on the score.

15 Claims, 6 Drawing Sheets

(56) References Cited

U.S. PATENT DOCUMENTS

| | | | |
|---|---|---|---|
| 2015/0363289 A1* | 12/2015 | Brough | H04L 43/16 |
| | | | 709/224 |
| 2017/0017576 A1 | 1/2017 | Cammarota et al. | |
| 2017/0034023 A1 | 2/2017 | Nickolov et al. | |
| 2017/0201574 A1 | 7/2017 | Luo | |
| 2018/0032216 A1* | 2/2018 | Naous | G06F 11/323 |
| 2018/0206010 A1 | 7/2018 | Rana et al. | |
| 2018/0302303 A1 | 10/2018 | Skovron et al. | |
| 2021/0365345 A1* | 11/2021 | Roy | G06F 11/0793 |

* cited by examiner

UPGRADE DETERMINATIONS OF DEVICES BASED ON TELEMETRY DATA

BACKGROUND

Client devices, such as computing devices typically run software programs that use various resources, such as memory. Over time, the software applications running on the client devices may become due for upgrades to provide additional modernized features as well as to improve security. Software upgrades generally increase the demand on the resources of the device since new features of the software may use additional processor capacity and/or memory capacity.

BRIEF DESCRIPTION OF THE DRAWINGS

Reference will now be made, by way of example only, to the accompanying drawings in which.

DETAILED DESCRIPTION

Devices connected to a network may be widely accepted and may often be more convenient to use. In particular, new services have developed to provide devices as a service where a consumer simply uses the device while a service provider maintains the device and ensures that its performance is maintained at a certain level.

Each device may have different resource capacities, such as a memory, that is dependent on the specific model of the device. The resource capacities may be chosen at the time the device is introduced into service based on various factors such as expected use. To make efficient use of resources on the device, it is to be appreciated that the use of resources is to be close to the maximum available resources. However, resource use of the device may vary over a period of time. For example, if the device is a personal computing device, such as a laptop or tablet, resource use may vary depending on the functions carried out by the device. If the device is used to display text to a user, such as when the user is reading a document or article, the resource use may be fairly low. In contrast, if the device is used to render complicated three-dimensional images, such as in a designing application, the resource use in the device may be quite high. Since devices may be used for this range of functions, the resource capacity is to be chosen to carry out the most computationally intensive tasks expected to be carried out on the device in a reasonable manner.

As software develops or evolves, the software typically uses an increased amount of resources to provide more features to a user of the software. In addition, the use of the device may evolve over time as the device may switch users, or the role of the user changes within an organization. Therefore, prior to performing a software upgrade on a client device, an analysis to determine how the device will perform after the upgrade. Depending on the results of the analysis, the upgrade may be implemented at the device if no significant decrease in performance is to be expected. If the analysis determines that the device may suffer from a decrease in performance, the upgrade may be suspended until a new device with improved resource capacities is assigned to the user. The analysis may also be used to perform audits on devices such that if a client device is determined to be underused, the device may be re-assigned to another user to make better use of resources.

Performing analysis on the usage of resources on a user device may be typically performed by consultants who may evaluate the effect of an upgrade to a specific device. In the present examples, the analysis is performed by an apparatus that applies the same model to all cases. Accordingly, this improves the accuracy and the objectivity of the analysis. Therefore, predictions of the effects of a software upgrade on an existing device may be used to make a determination as to the best course of action for a specific user device.

Figure 1:
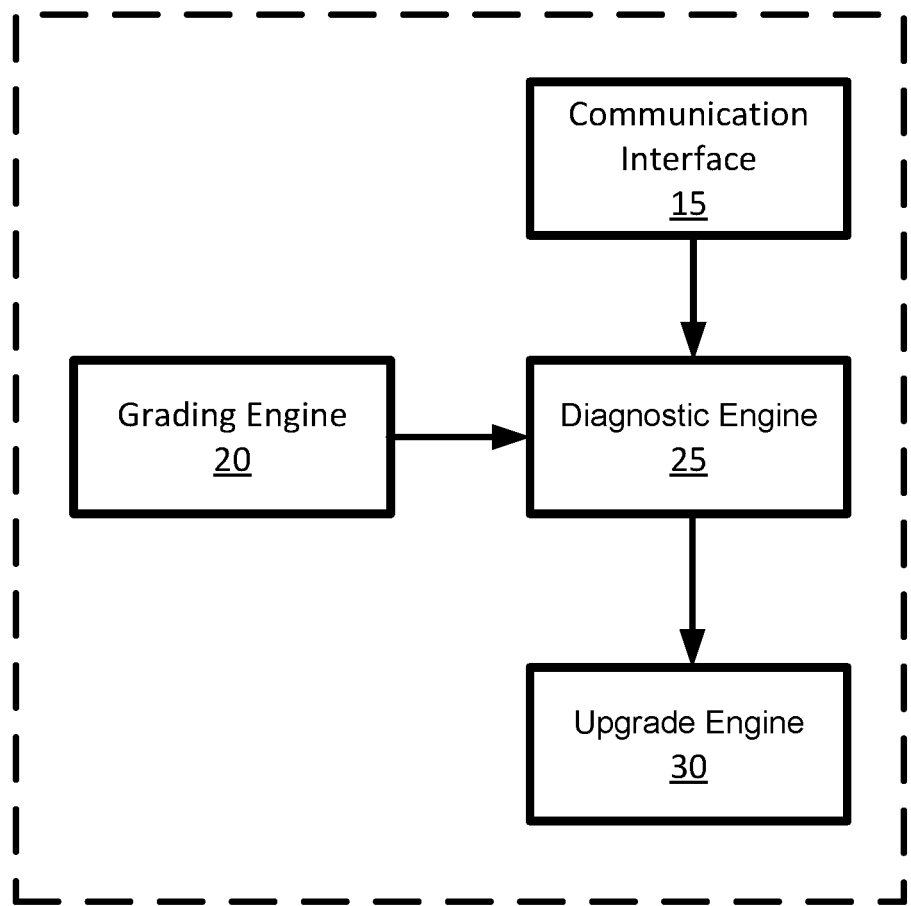
FIG. 1 is a block diagram of an example apparatus to generate a suitability metric to determine the suitability of an upgrade for a client device.
Figure 1:

Referring to FIG. 1, an example of an apparatus to generate a suitability metric to determine if an upgrade is suitable for a client device is generally shown at 10. The apparatus 10 may include additional components, such as various memory storage units, interfaces to communicate with other devices, and further input and output devices to interact with an administrator with access to the apparatus 10. In the present example, the apparatus 10 includes a communication interface 15, a grading engine 20, a diagnostic engine 25, and an upgrade engine 30. Although the present example shows the grading engine 20, the diagnostic engine 25, and the upgrade engine 30 as separate components, in other examples, the grading engine 20, the diagnostic engine 25, and the upgrade engine 30 may be part of the same physical component such as a microprocessor configured to carry out multiple functions.

The communications interface 15 is to communicate with client devices over a network. In particular, the communications interface 15 is to receive telemetry data from the client device. In the present example, the apparatus 10 may be in the cloud to manage a plurality of client devices. Accordingly, the communications interface 15 may be to receive telemetry data from several different client devices which the apparatus 10 manages.

The manner by which the communications interface 15 receives the telemetry data is not particularly limited. In the present example, the apparatus 10 may be a cloud server located at a distant location from the client devices which may be broadly distributed over a large geographic area. Accordingly, the communications interface 15 may be a network interface communicating over the Internet. In other examples, the communication interface 15 may connect to the client devices via a peer to peer connection, such as over a wire or private network.

In the present example, the telemetry data collected is not particularly limited. The telemetry data may include information about a client device, such as the resource capacity of the client device and a usage level of the resource. The specific resource is not particularly limited and may include available memory, such as Random Access Memory. In addition, the telemetry data may include other information about a specific client device, such as a device identifier, an account name, a model number, a manufacturer, a born-on date, and a device type. The telemetry data may also include hardware information, such as smart drive information, firmware revision, disk physical information like model, manufacturer, self-test results, and battery voltage. The telemetry data may be collected using a background process at the client device. The background process may use little resources such that it does not substantially affect foreground processes running on the device. In the present example, the telemetry data may be received by the communications interface 15 at regularly scheduled intervals. For example, the telemetry data may be received once a day. In other examples, the telemetry data may be received more frequently, such as every hour, or less frequently, such as every week.

The grading engine 20 is to generate a scoring map to be used with the telemetry data. In particular, the scoring map may be used to assign a grade to specific regions on the scoring map. In the present example, the scoring map may specific to a client device or a type of device. Accordingly, the grading engine 20 may use information from the telemetry data to generate the scoring map. It is to be appreciated that the manner by which the scoring map is generated by the grading engine 20 is not particularly limited. As an example, the scoring map may be a two-dimensional representation where a resource usage is plotted on an axis and the capacity of the resource is plotted on the other axis. Accordingly, the two-dimensional representation may represent different combinations of resource usage against the capacity of the resource for a type of device. The scoring map may also include a plurality of threshold limits dividing the scoring map into multiple regions or classification groups, where each region bound by a threshold limit may be used define a score of a client device. The score may be used to classify and group devices with different characteristics, such as resource capacities and average or median resource usage, to be treated similarly in regard to making a determination on whether an upgrade may be suitable. For example, a client device with a low resource capacity may be considered to be a high usage device when the average or median resource usage is determined to be a specific percentage. By contrast, a client device with a high resource capacity may be considered to be an average or low usage device when the average or median resource usage is determined to be the same percentage as the former device. In this example, the latter device is to be considered to have lower usage because of the additional resource capacity.

Figure 2:
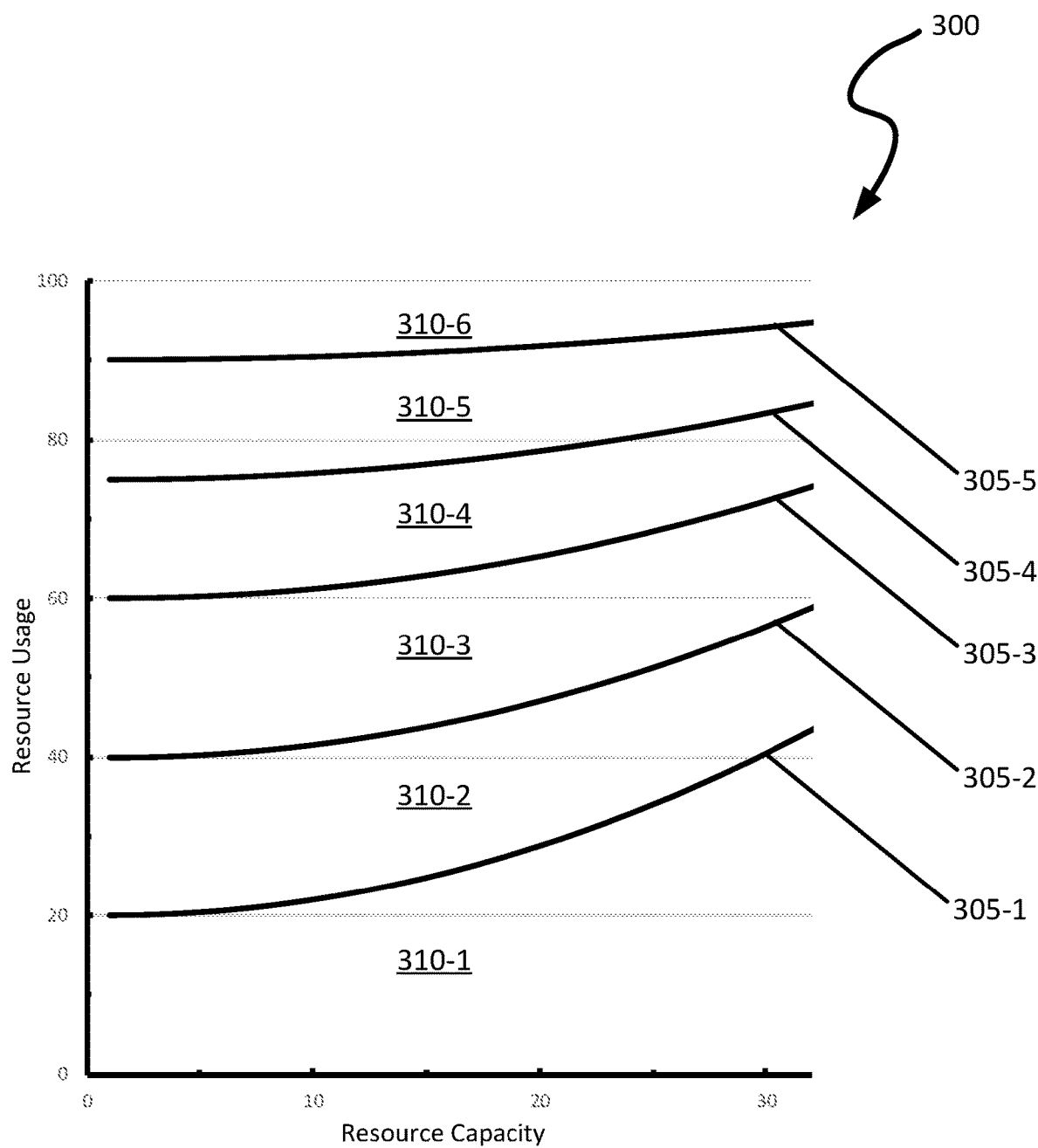
FIG. 2 is an example of a scoring map generated by the grading engine.

Referring to FIG. 2, an example of a scoring map generated by the grading engine 20 is generally shown at 300. In the scoring map 300, a plurality of threshold limits 305-1, 305-2, 305-3, 305-4, and 305-5 (generically, these threshold limits are referred to herein as "threshold limit 305" and collectively they are referred to as "threshold limits 305", this nomenclature is used elsewhere in this description). The threshold limits 305 divide the scoring map 300 into a plurality of regions 310-1, 310-2, 310-3, 310-4, 310-5, and 310-6. In this example, the threshold limits 305 are calculated based on a relationship between the value of a resource capacity and the value of a resource usage. In particular, the relationship in this example is a parabolic relationship where each threshold limit 305 has different parameters in the parabolic relationship. The parameters are not particularly limited and may be set based on empirical data. In other examples, the parameters may be based on a type of device or a group of devices. In examples where the parameters are based on the type of device, the parameters may be determined based on a device identifier received in the telemetry data. Accordingly, in such examples, the telemetry data may be used to determine or define the relationship between the resource capacity ant the resource usage.

Continuing with the example of the scoring map 300, an example of the calculation of the threshold limits 305 may be carried out as described below. It is to be appreciated that this is a non-limiting example but which the threshold limits 305 may be carried out. In other examples, other calculations may be performed based on other relationships between the value of a resource capacity and the value of a resource usage. In this example, the relationship between the value of a resource capacity (RC) installed on a client device and the threshold value of a resource usage ($T_k$) may be described using the following parabolic relationship:

$$T_k = (RC^2 \times a_k) + b_k$$

where $a_k$ is a parameter that may be defined as:

$$a_k = \frac{\text{var}_k}{[\max(RC)]^2}$$

where $\text{var}_k$ is a threshold variation for each threshold limit 305. In the present example, the threshold variation determines the extent to which a threshold limit 305 will curve. The determination of the threshold variation may be empirically determined. In addition, the threshold variation may vary between each threshold limit. In the present example, the threshold variation may also change for the calculation of each threshold limit 305. In particular, the present example decrements the threshold value by five for each successive threshold limit 305. The max(RC) is the maximum value of the resource capacity. For example, is the resource is memory, the max(RC) may be the largest amount of memory supported by a specific device.

In the present calculation of the threshold value of a resource usage, the value of $b_k$ represents an initial threshold when the value of a resource capacity is at zero. The values for $b_k$ are determined empirically.

In this example, it is to be assumed that a scoring map 300 is to be calculated for a client device based on an analysis of the memory usage. In this regard, it may be assumed that the median memory usage is determined to be 60%. The device in this example is to have an installed memory capacity of 16 GB and a maximum expansion capacity of 32 GB. An initial threshold variation (van) of 25 may be used in this example that decreases by five for each threshold limit 305 calculation. Accordingly, the value of $a_1$ may be calculated:

$$a_1 = \frac{25}{[32]^2} = 0.0244$$

The remaining values may be calculated as:

$$a_2 = \frac{20}{[32]^2} = 0.0195$$

$$a_3 = \frac{15}{[32]^2} = 0.0146$$

$$a_4 = \frac{10}{[32]^2} = 0.0098$$

$$a_5 = \frac{5}{[32]^2} = 0.0049$$

It may further be assumed for this example that the values for $b_k$ have been empirically determined to be 20, 40, 60, 75, and 90 for $b_1$, $b_2$, $b_3$, $b_4$, and $b_5$, respectively. Accordingly, the relationship between the value of a resource capacity (RC) installed on a client device and the threshold values for each threshold limit in the scoring map 300 may be described as:

$$T_1 = (RC^2 \times 0.0244) + 20$$

$$T_2 = (RC^2 \times 0.0195) + 40$$

$$T_3 = (RC^2 \times 0.0146) + 60$$

$$T_4 = (RC^2 \times 0.0098) + 75$$

$$T_5 = (RC^2 \times 0.0049) + 90$$

where $T_1$, $T_2$, $T_3$, $T_4$, and $T_5$ represent the threshold limits 305-1, 305-2, 305-3, 305-4, 305-5, respectively.

Each region 310 of the scoring map 300 defined by the threshold limits 305 may be assigned a grade or score. In the present example, the scores assigned to the regions 310-1, 310-2, 310-3, 310-4, 310-5, and 310-6 are 5.0, 4.0, 3.0, 2.0, 1.0, and 0, respectively. Therefore, in the present example, a client device with a low score will indicate that the client device has a high level of resource usage. By contrast, a client device with a high score will indicate that the client device has low usage and may be underused. Whether the device is overused or underused may be taken into consideration whether the implement an upgrade at the device. For example, if a client device is considered to be overused, an upgrade of the software may result increased resource usage and further worsening the overuse issue. Conversely, if a client device is considered underused, it may be assumed that increasing the demand of resources after an upgrade may not significantly impact the performance of the client device.

The diagnostic engine 25 is to generate a score based on the application of a scoring map based on the telemetry data received via the communication interface 15. In the present example, the diagnostic engine 25 is in communication with both the communication interface 15 to receive the telemetry data as well as the grading engine 20 to receive the scoring map.

The manner by which the score is generated is not particularly limited. Continuing with the present example of the scoring map 300, an example of a score calculated by the diagnostic engine 25 is illustrated for telemetry data from a client device having a median memory usage of 60% and an installed memory capacity of 16 GB. Referring to the scoring map 300, the device with these characteristics falls within region 310-3. Accordingly, a base score of 3 may be associated with the device. In order to determine the exact score of the device, the value may be determined by using a linear regression between the threshold limit 305-2 and 305-3 when the resource capacity is set at 16 GB. In this specific example, the range between the threshold limit 305-2 and 305-3 is 44.9920 and 63.7376. Since the median usage is assumed to be 60%, this generates a score of 3.1994. It is to be appreciated that the calculation of the exact score is not limited. In other examples, other approximations that may be more accurate than a linear regression may be used.

The upgrade engine 30 is to implement an upgrade at the client device based on the score determined by the diagnostic engine 25. For example, if the score calculated by the diagnostic engine 25 is over a predetermined threshold, the client device may be considered to be underused and a good candidate for an upgrade to be implemented since the client device has capacity to handle additional demands on resources generally associated with software upgrades. Alternatively, if the score is below the threshold score, the client device may be overused. In the case the client device is overused, upgrading the software on the device may result in higher demand on resources and thus decrease the performance of the client device.

The manner by which the upgrade engine 30 implements the upgrade is not limited. For example, the upgrade engine 30 may prompt a user of the client device to download and install an upgrade. In other examples, the upgrade engine 30 may push the upgrade to the client device without further input from the user, such as in a managed client device.

Figure 3:
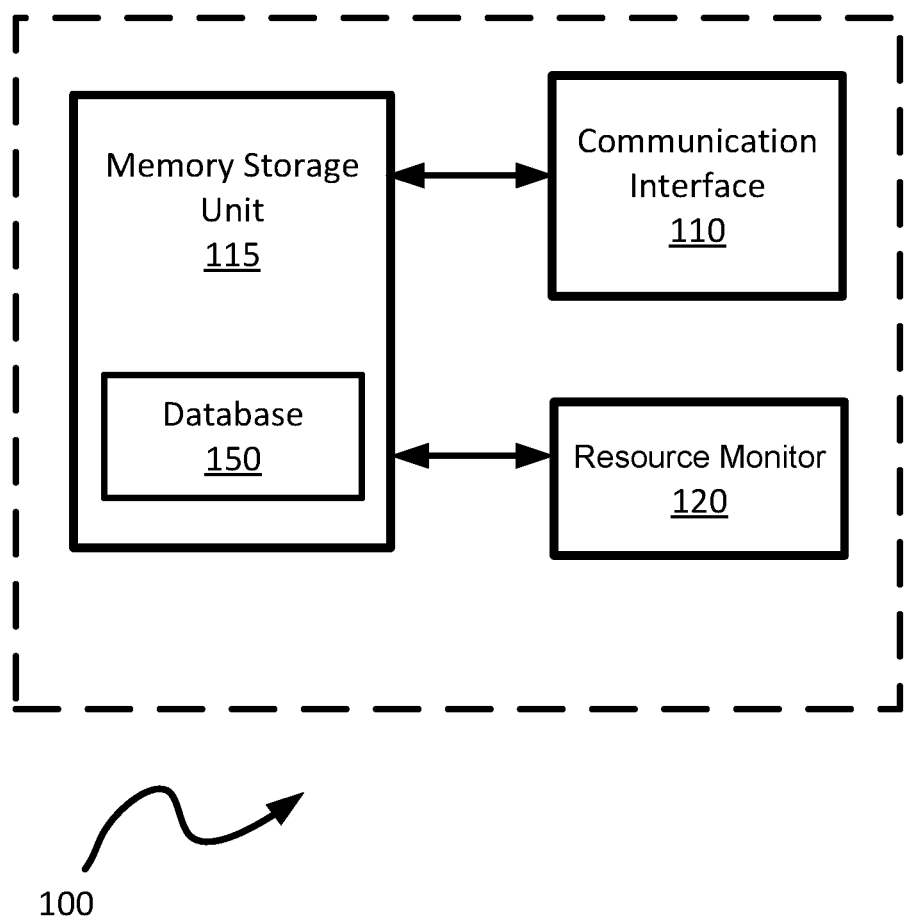
FIG. 3 is a block diagram of an example client device to collect the telemetry data to forward to the apparatus.

Referring to FIG. 3, an example of a client device for which the suitability metric is to be determined is generally shown at 100. The client device 100 is not particularly limited and may be any other device connected to the apparatus 10, such as a shared device like a desktop computer, a tablet, or a smartphone. The client device 100 may include additional components, such as various memory storage units, interfaces to communicate with other devices, and may include peripheral input and output devices to interact with a user. In the present example, the client device 100 includes a communication interface 110, a memory storage unit 115 for storing a database 150, and a resource monitor 120.

The communications interface 110 is to communicate with the apparatus 10 over a network. In the present example, the client device 100 may be connected to a cloud to be managed by the apparatus 10 in the cloud. Accordingly, the communications interface 110 may be to transmit telemetry data from the memory storage unit 115 for processing by the apparatus 10 to determine a score related to the suitability for an upgrade. The manner by which the communications interface 110 transmits the telemetry data is not particularly limited. In the present example, the client device 100 may connect with the apparatus 10 at a distant location over a network, such as the internet. In other examples, the communication interface 110 may connect to the apparatus 10 via a peer to peer connection, such as over a wired or private network. In the present example, the apparatus 10 is a central server. However, in other examples, the apparatus 10 may be a virtual server existing in the cloud where functionality may be distributed across several physical machines.

The memory storage unit 115 is coupled to the communications interface 110 and the resource monitor 120 and may include a non-transitory machine-readable storage medium that may be any electronic, magnetic, optical, or other physical storage device. In the present example, the memory storage unit 115 may also maintain a database 150 to store telemetry data associated with the client device 100. For example, present and historical telemetry data may be stored in the database 150 for subsequent use.

The resource monitor 120 is to collect telemetry data from a resource within the client device 100. The resources from which the resource monitor 120 collects data are not limited and may include resources such as volatile memory (e.g. Random Access Memory), non-volatile memory storage devices (e.g. a hard drive, a solid-state drive, a non-volatile memory controller), batteries, displays, processors, applications, or other software running on the client device 100. In the present example, the resource monitor 120 is to collect telemetry data regarding volatile memory usage. Specifically, the resource monitor 120 determines and average or median usage for the client device 100.

Figure 4:
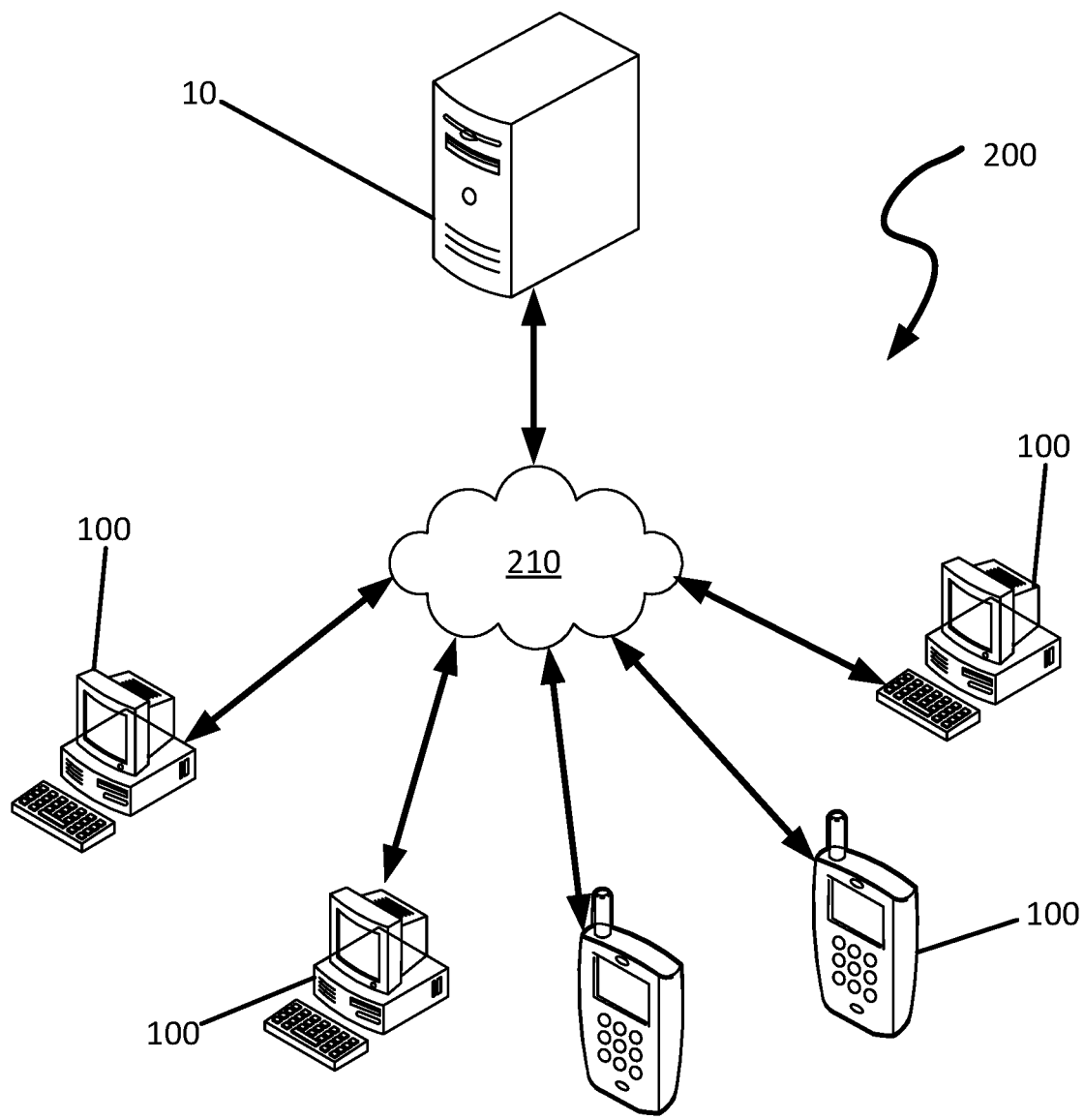
FIG. 4 is a representation of an example system to generate a suitability metric to determine the suitability of an upgrade for a client device.

Referring to FIG. 4, an example of a system to generate suitability metrics for client devices is generally shown at 200. In the present example, the apparatus 10 is in communication with a plurality of client devices 100 via a network 210. It is to be appreciated that the client devices 100 are not limited and may be a variety of client devices 100 managed by the apparatus 10. For example, the client device 100 may be a personal computer, a tablet computing device, a smart phone, or laptop computer.

Figure 5:
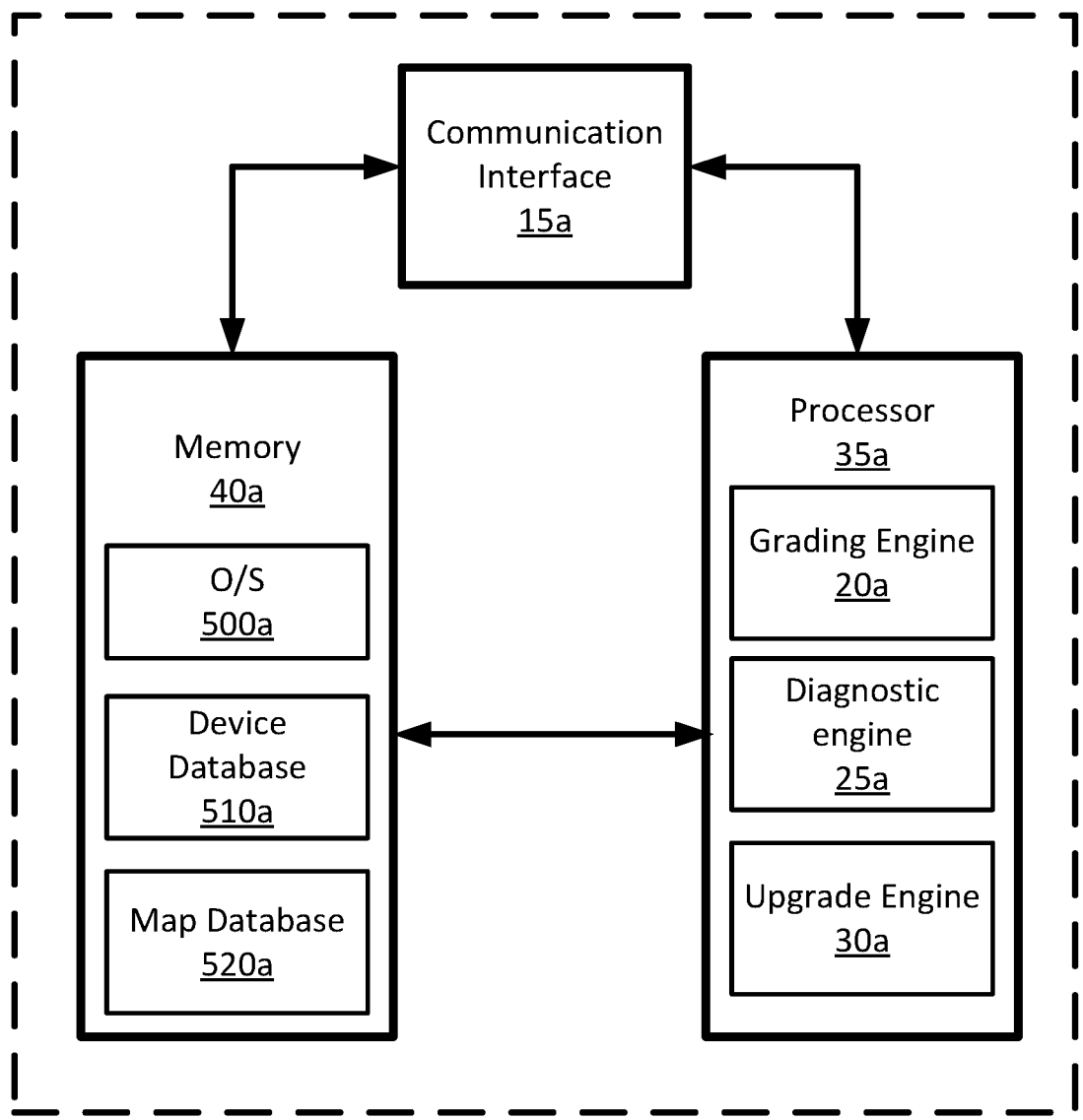
FIG. 5 is a block diagram of another example apparatus to generate a suitability metric to determine the suitability of an upgrade for a client device.
Figure 5:
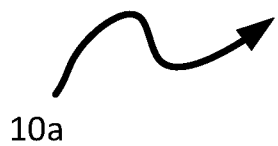

Referring to FIG. 5, another example an apparatus to generate a suitability metric to determine if an upgrade is suitable for a client device 100 is generally shown at 10a. Like components of the apparatus 10a bear like reference to their counterparts in the apparatus 10, except followed by the suffix "a". The apparatus 10a includes a communication interface 15a, a grading engine 20a, a diagnostic engine 25a, and an upgrade engine 30a. In the present example, the grading engine 20a, the diagnostic engine 25a, and the upgrade engine 30a are implemented by a processor 35a. The apparatus 10a further includes a memory storage unit 40a.

The processor 35a may include a central processing unit (CPU), a graphics processing unit (GPU), a microcontroller, a microprocessor, a processing core, a field-programmable gate array (FPGA), an application-specific integrated circuit (ASIC), or similar. The processor 35a and the memory storage unit 40a may cooperate to execute various instructions. In the present example, the processor 35a may execute instructions stored on the memory storage unit 40a to implement the grading engine 20a, the diagnostic engine 25a, and the upgrade engine 30a. In other examples, the grading engine 20a, the diagnostic engine 25a, and the upgrade engine 30a may each be executed on a separate processor. In further examples, the grading engine 20a, the diagnostic engine 25a, and the upgrade engine 30a may be operated on a separate machine, such as from a software as a service provider or in a virtual cloud server.

The memory storage unit 40a is to store various data and information on the apparatus 10a. The components of the memory storage unit 40a are not particularly limited. For example, the memory storage unit 40a may include a non-transitory machine-readable storage medium that may be, for example, an electronic, magnetic, optical, or other physical storage device. In addition, the memory storage unit 40a may store an operating system 500a that is executable by the processor 35a to provide general functionality to the apparatus 10a. For example, the operating system may provide functionality to additional applications. Examples of operating systems include Windows™, macOS™, iOS™, Android™, Linux™, and Unix™. The memory storage unit 40a may additionally store instructions to operate at the driver level as well as other hardware drivers to communicate with other components and peripheral devices of the apparatus 10a.

In the present example, the memory storage unit 40a may include a device database 510a for storing information regarding different client devices 100. For example, the device database 510a may include a lookup table where resource capacities and other specifications of a client device may be stored. Accordingly, upon receiving a device identifier with the telemetry data, the apparatus 10a may obtain further information about the client device 100 by retrieving the information from the device database 510a.

In addition, the memory storage unit 40a may also include a map database 520a for storing scoring maps associated with a client device 100. In an example, the grading engine 20a may generate a scoring map associated with the client device 100. For similar client devices where the same scoring map may be used, the scoring map may be retrieved from the map database 520a without the grading engine 20a carrying out the steps to generate the scoring map from scratch. The map database 520a may also be used for the same client device, such as for a determination of whether further upgrades may be suitable for the client device, or if the client device increased its resource capacity from a hardware upgrade.

The similarity between client devices to allow for the same scoring map to be used is not limited. In the present example, the same scoring map may be used for client devices having substantially identical hardware setups, such as for client devices of the same model and resource capacities. In a system of managed devices, such as within a corporation, this may be a common scenario as identical devices may be obtained for a group of employees such that the computing resources are standardized for easier maintenance and troubleshooting. In other examples, the same scoring map may be used for client devices from the same manufacturer, such that several models may use the same scoring map. In further examples, larger groups may be defined based on hardware and/or software characteristics of the client devices.

Figure 6:
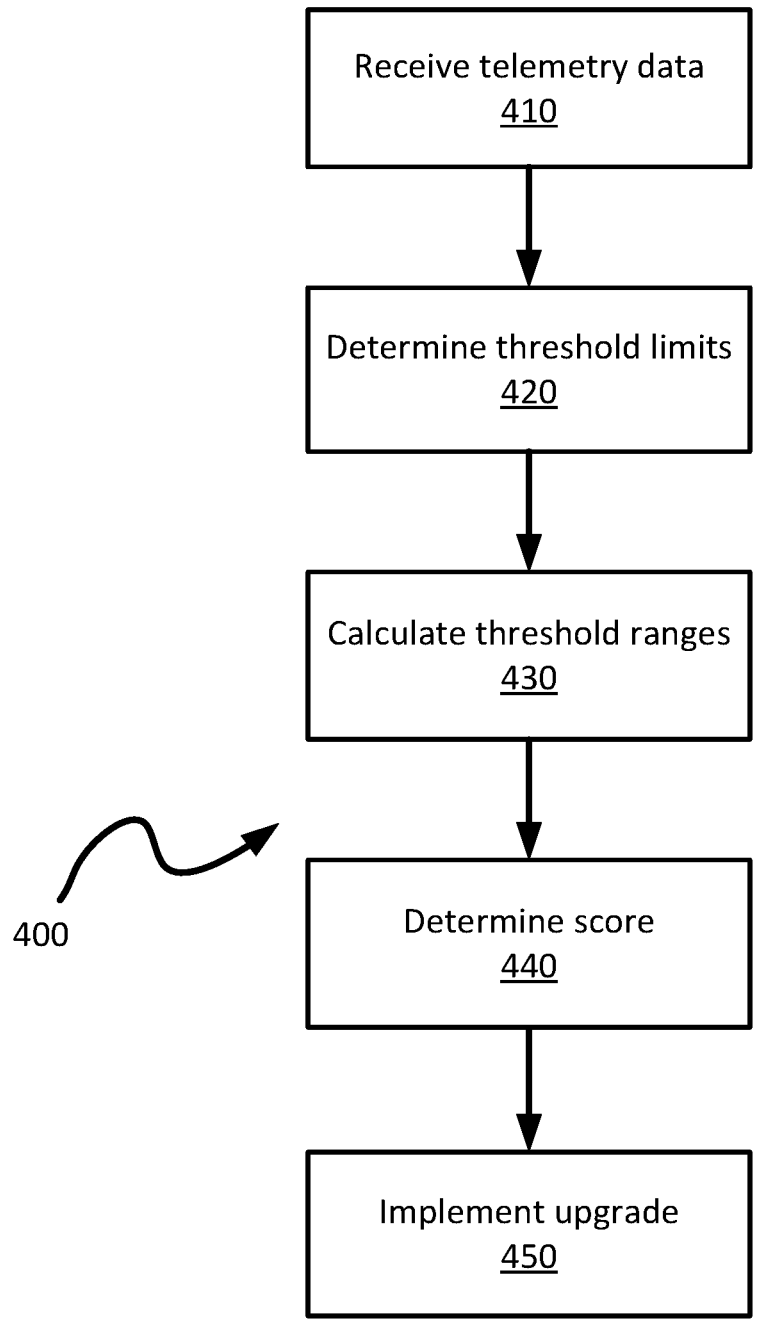
FIG. 6 is a flowchart of an example method of generating a suitability metric to determine the suitability of an upgrade for a client device by a server in the cloud.

Referring to FIG. 6, a flowchart of an example method to generating a suitability metric to determine if an upgrade is suitable for a client device is generally shown at 400. In order to assist in the explanation of method 400, it will be assumed that method 400 may be performed with the system 200. Indeed, the method 400 may be one way in which system 200 along with an apparatus 10 and client device 100 may be configured. Furthermore, the following discussion of method 400 may lead to a further understanding of the system 200 and the apparatus 10 and client device 100. In addition, it is to be emphasized, that method 400 may not be performed in the exact sequence as shown, and various blocks may be performed in parallel rather than in sequence, or in a different sequence altogether.

Beginning at block 410, telemetry data is received from the client device 100. In the present example, the resource monitor 120 is used to collect the telemetry data associated with resource usage through a background process running on the client device 100. The background process carried out by the resource monitor 120 is to use a relatively small amount of processor resources such that the background process does not substantially affect foreground processes running on the client device 100. For example, the resource monitor 120 may take a snapshot of a resource usage, such as a processor capacity or a memory usage, periodically after a predetermined period of time. The frequency is not limited and it may be every second, minute, hour, day, etc. Accordingly, a user of the client device 100 may not notice that telemetry data is being collected during normal use of the device. In the present example, the telemetry data may include a memory capacity and a usage level.

Additional telemetry data may also be retrieved from the database 150 of the memory storage unit 115. For example, the database 150 may include telemetry data such as device information, which may include a company name, hostname, PC model, PC manufacturer, born on date, product type, etc., component information, such as smart drive information, firmware revision, sectors count, total capacity, used capacity, cell voltage, electric current, and charge capacity.

Block 420 comprises determining a plurality of threshold limits based on the telemetry data. In the present example, the grading engine 20 performs the calculations to generate the threshold limits. In the present example, the threshold limits may define a scoring map having multiple regions or classification groups, where each region bound by a threshold limit may be used define a score of a client device. The score may be used to classify and group devices with different characteristics, such as resource capacities and average or median resource usage, to be treated similarly in regard to making a determination on whether an upgrade may be suitable. For example, a client device with a low resource capacity may be considered to be a high usage device when the average or median resource usage is determined to be a specific percentage. By contrast, a client device with a high resource capacity may be considered to be an average or low usage device when the average or median resource usage is determined to be the same percentage as the former device. In this example, the latter device is to be considered to have lower usage because of the additional resource capacity.

Block 430 involves calculating a plurality of threshold ranges based on the memory capacity of the client device 100. In the present example, the threshold range represents the distance between a pair of adjacent threshold limits for the memory capacity of the client device 100. Accordingly, each threshold range may represent a range of usage levels within a region of the scoring map. Referring to the example scoring map 300 in FIG. 2, the threshold ranges for are [0-26.2464]; (26.2464-44.9920]; (44.9920-63.7376]; (63.7376-77.5088]; (77.5088-91.2544]; and (91.2544-100.0000] for regions 310-1, 310-2, 310-3, 310-4, 310-5, and 310-6, respectively, when the resource capacity is assumed to be 16 GB.

Block 440 determines the score based on the usage level of the client device 100 by mapping it to the plurality of threshold ranges calculated at block 430. The manner by which the score is determined is not particularly limited. Continuing with the present example of the scoring map 300 and the ranges determined at block 430, an example of a score calculation of a client device having a median memory usage of 60%. In this example, the device with a memory usage level of 60% falls within region 310-3 having a threshold range between 44.9920 and 63.7376. Accordingly, a base score of 3 may be associated with the client device. In order to determine the exact score of the client device, the value may be determined by using a linear regression through the threshold range when the resource capacity is set at 16 GB. In this specific example, the threshold range is between 44.9920 and 63.7376. Since the median usage is assumed to be 60%, this represent 19.94% of the distance from the upper threshold limit 305-3 to the lower threshold limit 305-2. In the present example, the exact value within the threshold range may be calculated by measuring the distance on the scoring map 300 within the threshold limits. Accordingly, adding 19.94% to the base score of 3 may provide an exact score of 3.1994. In other examples, Block 450 involves implementing an upgrade at the client device based on the score. For example, if the score determined at block 440 is over a predetermined threshold, the client device may be considered to be underused and a good candidate for an upgrade to be implemented due to capacity to handle additional demands on resources from a software upgrade. The manner by which the upgrade is implemented is not limited. For example, a prompt to a user of the client device may be generated such that the user is to take action to download and install an upgrade. In other examples, upgrades may be push to the client device without further input from the user, such as for managed client device where a central administration server applies a policy to all client devices.

Various advantages will now become apparent to a person of skill in the art. For example, the system 200 provides a manner by which a suitability metric, such as a score may be determined by an apparatus 10 based on telemetry data received from a client device 100 to make an objective determination of whether the client device 100 is a good candidate for a software upgrade.

Other applications of the suitability metric or the score generated by the diagnostic engine 25 are also contemplated. For example, the determination of the client device 100 with a high score (i.e. underused) may result in the client device 100 being re-assigned to another user that uses more computing resources. The old client device may then be replaced with another client device having more limited hardware components, such as a smaller memory capacity. Conversely, the determination of a client device 100 with a low score (i.e. overused) may indicate that the user is due for an upgrade to the hardware.

In particular, the score may also be used with machine learning techniques such as logistic regression or clustering algorithms to measure how fit a device is for the user's demands. For example, machine learning algorithms may predict when a user may be due for a hardware upgrade and/or trigger alarms to advise an administrator before the user starts to experience performance issues due to hardware capacity. Additionally, as an extension of the model an agent or application may be installed on the client device to receive instructions to change configurations to improve the user experience, such as closing unused applications, stopping unused services or applications during periods when the score is low.

It should be recognized that features and aspects of the various examples provided above may be combined into further examples that also fall within the scope of the present disclosure.

What is claimed is:

1. An apparatus comprising:
a communication interface to receive telemetry data from a client device, wherein the telemetry data includes a resource capacity and a resource usage level;
a grading engine to generate a scoring map that relates the resource usage to the resource capacity;
a diagnostic engine in communication with the communication interface and the grading engine, wherein the diagnostic engine is to generate a score based on an application of the scoring map on the telemetry data; and
an upgrade engine to implement an upgrade at the client device based on the score indicating that the resource capacity is sufficiently above the resource usage level to support operation of the client device with the upgrade.

2. The apparatus of claim 1, wherein the resource capacity is a memory capacity.

3. The apparatus of claim 1, wherein the scoring map includes a plurality of threshold limits.

4. The apparatus of claim 3, wherein a threshold limit selected from the plurality of threshold limits is to define the score.

5. The apparatus of claim 4, wherein the threshold limit is based on a resource capacity value.

6. The apparatus of claim 5, wherein the communication interface receives a device identifier.

7. The apparatus of claim 6, wherein the device identifier is to determine a relationship between the threshold limit and the resource capacity value.

8. A method comprising:
receiving telemetry data from a client device, wherein the telemetry data includes a memory capacity and a memory usage level;
determining a plurality of threshold limits based on the telemetry data;
calculating a plurality of threshold ranges based on the memory capacity and the plurality of threshold limits;
determining a score based on the memory usage level and the plurality of threshold ranges; and
implementing an upgrade at the client device based on the score indicating that the memory capacity is sufficiently above the memory usage level to support operation of the client device with the upgrade.

9. The method of claim 8, wherein implementing the upgrade comprises implementing the upgrade if the score is above a predetermined threshold.

10. The method of claim 8, wherein determining the score comprises calculating a range percentage of the memory usage level within a threshold range of the plurality of threshold ranges.

11. The method of claim 10, wherein determining the score comprises adding the range percentage to a base score.

12. The method of claim 8, wherein the telemetry data includes a device identifier.

13. The method of claim 12, wherein determining the plurality of threshold limits is based on the device identifier.

14. A non-transitory machine-readable storage medium encoded with instructions executable by a processor, the non-transitory machine-readable storage medium comprising:
instructions to receive telemetry data from a client device, wherein the telemetry data includes a memory capacity and a memory usage level;
instructions to determine a first threshold limit based on the telemetry data;
instructions to determine a second threshold limit based on the telemetry data;
instructions to calculate a threshold range between the first threshold limit and the second threshold limit based on the memory capacity;
instructions to determine a score based on the memory usage level and the threshold range; and
implementing an upgrade at the client device based on the score indicating that the memory capacity is sufficiently above the memory usage level to support operation of the client device with the upgrade.

15. The non-transitory machine-readable storage medium of claim 14, wherein the non-transitory machine-readable storage medium comprises instructions to implement the upgrade if the score is above a predetermined threshold.

* * * * *